(12) United States Patent
Varadharaj Singaravelu

(10) Patent No.: US 11,716,275 B1
(45) Date of Patent: Aug. 1, 2023

(54) ASSISTANT FOR AUTOMATIC GENERATION OF SERVER LOAD TEST SCRIPTS

(71) Applicant: U.S. Bank National Association, Minneapolis, MN (US)

(72) Inventor: Premraj Varadharaj Singaravelu, Plano, TX (US)

(73) Assignee: U.S. Bank National Association, Minneapolis, MN (US)

( * ) Notice: Subject to any disclaimer, the term of this patent is extended or adjusted under 35 U.S.C. 154(b) by 12 days.

(21) Appl. No.: 17/394,929

(22) Filed: Aug. 5, 2021

(51) Int. Cl.
| H04L 43/50 | (2022.01) |
| H04L 43/0876 | (2022.01) |
| H04L 43/55 | (2022.01) |
| H04L 43/00 | (2022.01) |
| H04L 43/08 | (2022.01) |
| H04L 9/40 | (2022.01) |
| H04L 67/02 | (2022.01) |
| H04L 67/50 | (2022.01) |
| H04L 61/4511 | (2022.01) |

(52) U.S. Cl.
CPC .............. *H04L 43/50* (2013.01); *H04L 43/00* (2013.01); *H04L 43/08* (2013.01); *H04L 43/0876* (2013.01); *H04L 43/55* (2022.05); *H04L 61/4511* (2022.05); *H04L 63/1408* (2013.01); *H04L 63/1416* (2013.01); *H04L 67/02* (2013.01); *H04L 67/535* (2022.05)

(58) Field of Classification Search
CPC ..... H04L 43/50; H04L 43/0876; H04L 43/55; H04L 43/08; H04L 61/4511; H04L 43/00; H04L 67/535; H04L 67/02; H04L 63/1408; H04L 63/1416
See application file for complete search history.

(56) References Cited

U.S. PATENT DOCUMENTS

| 8,898,137 B1 * | 11/2014 | Brundage ........... G06F 16/9566 707/708 |
| 8,977,904 B2 * | 3/2015 | Kraus .................... G06F 11/263 717/124 |
| 2005/0138104 A1 * | 6/2005 | Houh .................. G06F 11/3684 709/200 |
| 2005/0267976 A1 * | 12/2005 | Chang ................. H04L 63/0815 709/230 |
| 2007/0208576 A1 * | 9/2007 | Lee ........................ G06F 16/88 709/230 |
| 2010/0312821 A1 * | 12/2010 | Bannoura ............. G06F 16/958 709/203 |

(Continued)

OTHER PUBLICATIONS

An IP.com Prior Art Database Technical Disclosure Authors et. al.: "A System and Method to Execute Performance Test Based on Historical Usage Data" Original Publication Date: Aug. 1, 2007 IP.com No. IPCOM000156727D pp. 1-4 (Year: 2007).*

*Primary Examiner* — Mohamed A. Wasel
*Assistant Examiner* — Rachel J Hackenberg
(74) *Attorney, Agent, or Firm* — Merchant & Gould P.C.

(57) ABSTRACT

This disclosure is directed to systems and methods for generating correlated load test scripts for use in load testing by receiving an archive of transaction records, each transaction record including a request and a response, organizing the archive of transaction records, determining a collection of transaction records, generating a plain load test script, and correlating the plain load test script to generate a correlated load test script.

19 Claims, 14 Drawing Sheets

(56) References Cited

U.S. PATENT DOCUMENTS

2013/0097307 A1\* 4/2013 Vazac .................... H04L 43/50
    709/224
2018/0011774 A1  1/2018 Vazac et al.
2020/0322332 A1\* 10/2020 Haque .................... H04L 63/18

\* cited by examiner

ASSISTANT FOR AUTOMATIC GENERATION OF SERVER LOAD TEST SCRIPTS

FIELD OF THE DISCLOSURE

Examples described herein generally relate to server load testing, and more specifically, to systems, methods, and computer program products for enabling the automatic generation of load test scripts to implement server load testing.

BACKGROUND

A domain name identifies a portion of a network address belonging to a particular domain. Data is oftentimes shared using websites, in which a set of related web pages is located under a single domain name. The data can be accessed by, for example, requesting information that identifies the single domain name in a request to a resource stored on a server.

Nowadays, websites are more versatile and offer features that were not previously available. Web content, for example, can be accessed through various different platforms. Additional functionality from websites is continually demanded, however. Consequently, they can become unstable and error prone. Website operators desire to ensure stable and efficient data communications so that users requesting resources from their websites can always access the requested data that is, for example, stored on a server owned and/or operated by the website operator. To this end, website operators have server load tests performed on websites that, for example, provide different load types such as higher than normal data communication requests that occur for periods of time throughout the day. These tests are sometimes performed by engineers, particularly server performance engineers.

A server performance engineer typically performs server load testing to monitor data communication performance issues such as bottlenecks, slow load times, and web page rendering problems. The server engineer may analyze server response times, throughput rates, resource utilization levels, and more through load testing. The server performance engineer's goal is to ensure that the server performs as expected and/or desired while the server experiences different load types to ensure that the server does not experience down time and/or other undesired characteristics. For example, the server engineer may load test a server to evaluate the server's operation when the server is experiencing a heavy load of requests. Load testing can include simulating a large number of data communication requests to evaluate server performance under a desired load. One way of performing load testing involves the use of a so-called "test script." A test script is a set of instructions that is performed on a system under test to verify that the system performs as expected. They can be written in either a human language (used for manual testing) or a scripting/programming language (used for automated testing). To load test a server, the server performance engineer uses a particular type of test script, referred to as a load test script. When executed, a load test script emulates a transaction with the server. The server performance engineer needs reliable access to load test scripts to be able to ensure that the server the engineer needs to test will not experience down time and/or other undesired characteristics. However, building load test scripts manually can be prohibitively time consuming and/or impossible due to the amount of data that needs to be correlated and/or the format of the data that is used to build the load test script.

Data communication over the Internet are typically performed via a Hypertext Transfer Protocol (HTTP) request or a secure version of an HTTP, Hypertext Transfer Protocol Secure (HTTPS). For brevity only HTTP will be referred to, but the following discussion applies to both HTTP and HTTPS. An HTTP request is a request made by a user of a web browser to a host located on a server. The request is to access a resource stored on the server. The user typically initiates the request by inputting components of a Uniform Resource Locator (URL), which includes the necessary information to access the resource. The term "resource" is any resource on the web, such as HTML files, stylesheets, images, videos, and scripts.

A server performance engineer also can use performance data stored in a HTTP Archive (HAR) file for load testing. The HAR format is an archive file format for logging a transaction between a web browser and a website when the web browser initiates an HTTP request, and HAR file information is stored in the JavaScript Object Notation (JSON) format. Specifically, a HAR file contains detailed performance data about the one or more web pages a web browser loads including the time the request was stalled before the request was sent, the time spent negotiating with the proxy server connection, the time spent to fetch Domain Name System (DNS) information, the time spent to establish a connection, the time spent completing a Secure Sockets Layer (SSL) handshake, the time spent issuing the network request, the time spent waiting for the initial response from the server, and the time spent transferring assets from the server to the web browser. Any of the information contained in the HAR file can be used to perform the desired server load testing.

As explained above, a large amount of time is spent on manually building load test scripts. This is because test scripts are typically built by capturing a log file, such as a HAR file, and then manually reviewing the log file for all the parameters that are desired for the specific load test to be run. The parameters are then manually loaded (e.g., by the server performance engineer) into a test script. This process involves repeatedly correlating parameters and other components of the log file to a request to access a resource and then building relationships between the data. The parameters and components are correlated, for example, to the requests for resources to account for dynamic resources that produce different values each time the resource is requested. For the load test to work correctly, the load test script must be correlated to handle dynamic resources or values such as tokens and cookies. Correlation extracts and stores the dynamic resource, also referred to as a correlation value, in the response of the transaction record to be used in subsequent requests, such as a request performed during load testing. Manually building the load test scripts is time consuming, tedious, error-prone, and burdensome. Manually building a load test script can take a server performance engineer weeks to complete. Additionally, for certain operations, it is simply impossible for a server performance engineer to manually correlate parameters and/or components of the log file to a request to access a resource and/or build relationships between the data. For example, the log file may be formatted such that the server performance engineer cannot determine how a parameter should be correlated to a request to access a resource.

SUMMARY

In general terms, this disclosure is directed to systems and methods for generating correlated load test scripts for use in load testing by receiving an archive of transaction records, each transaction record including a request and a response, organizing the archive of transaction records, determining a collection of transaction records, generating a plain load test script, and correlating the plain load test script to generate a correlated load test script.

One aspect is a computer-implemented method for load test script generation, comprising: receiving an archive of one or more transaction records between one or more web browsers and one or more servers, wherein each transaction record includes: a request to access a resource stored on a server of the one or more servers including a web address comprising a domain name identifying a location of the resource; and a response to the request to access the resource; determining one or more domain names identifying a portion of a network address belonging to a particular domain, thereby generating one or more required domain names; determining a collection of transaction records, the collection comprising each transaction record of the archive having the domain name of the request corresponding to the one or more required domain names; generating a plain load test script including each transaction record in the collection of transaction records, generating the plain load test script comprising: converting the request of each transaction record in the collection of transaction records to a formatted request; and converting the response of each transaction record in the collection of transaction records to a formatted response; and correlating the plain load test script to generate a correlated load test script.

Another aspect is a non-transitory computer-readable medium having stored thereon one or more sequences of instructions for causing one or more processors to perform: receiving an archive of one or more transaction records between one or more web browsers and a plurality of servers, wherein each transaction record includes: a request to access a resource stored on a server of the plurality of servers, wherein each request includes: a request header; a request cookie; a request query parameter; and a web address comprising a domain name identifying a location of the resource; and a response to the request, wherein each response includes a response body; determining a group of transaction records comprising transaction records of the archive wherein the response is dynamic; receiving one or more selected domain names; determining a collection of transaction records, the collection of transaction records comprising each transaction record of the archive having the domain name of the request corresponding to the one or more selected domain names; generating a plain load test script including each transaction record in the collection of transaction records, comprising: converting the request of each transaction record in the collection of transaction records to a formatted request, comprising performing a first value conversion operation on: the request header; the request cookie; and the request query parameter; converting the response of each transaction record in the collection of transaction records to a formatted response, comprising performing a second value conversion operation on the response body; and correlating the plain load test script to generate a correlated load test script.

A further aspect is a system for generating test load scripts, comprising: a collection processor operable to: receive an archive of one or more transaction records between one or more web browsers and one or more servers, wherein each transaction record includes: a request to access a resource stored on a server of the one or more servers, wherein each request includes a web address comprising a domain name identifying a location of the resource; and a response to the request to access the resource; determine one or more domain names identifying a portion of a network address belonging to a particular domain, thereby generating one or more required domain names; determine a collection of transaction records, the collection comprising each transaction record of the archive having the domain name of the request corresponding to the one or more required domain names; a load test script processor operable to: generate a plain load test script including each transaction record in the collection of transaction records, generating the plain load test script comprising: converting the request of each transaction record in the collection of transaction records to a formatted request; converting the response of each transaction record in the collection of transaction records to a formatted response; and updating a template with the formatted request of each transaction record and the formatted response of each transaction record; and a load test script correlation processor operable to: correlate the plain load test script to generate a correlated load test script, correlating the plain load test script comprising: determining a time each request in the plain load test script occurs; updating the template to contain the time each request in the plain load test script occurs; and using the template, correlating each transaction record in the plain load test script in an order based on the time of each request in the plain load test script occurs, correlating each transaction record comprising: evaluating the formatted response to identify a position of a correlation value; capturing a left boundary of the correlation value; capturing a right boundary of the correlation value; when the right boundary is able to be captured: performing a boundary extraction method to extract the correlation value; and when the right boundary is not able to be captured: performing a regular expression extraction method to extract the correlation value.

BRIEF DESCRIPTION OF THE DRAWINGS

Various examples will be described in detail with reference to the following drawings, wherein like reference numerals represent like parts and assemblies throughout the several views.

DETAILED DESCRIPTION

Figure 1A:
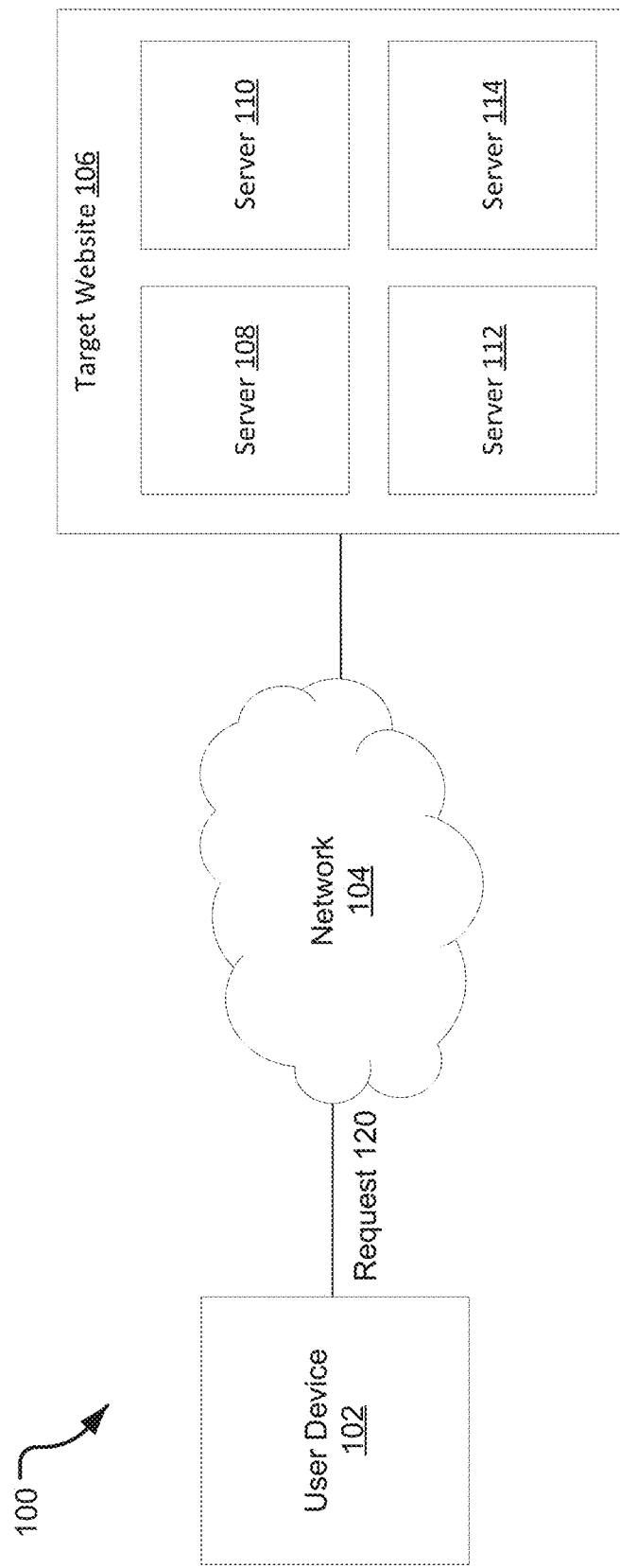
FIG. 1A is a block diagram illustrating an example network environment where a transaction including a request to access a resource may be implemented.

Generally, the present disclosure describes systems and methods for generating correlated load test scripts for use in load testing by receiving an archive of transaction records. An archive of transaction records is a library of records of transactions that have been performed between a web browser and servers of one or more websites. The archive can include any number of transaction records. Examples of such archive of transaction records are provided below. Each transaction record in the archive of transaction records includes a request and a response. The archive of transaction records is organized and a collection of transaction records is determined. Using this information, a so-called plain load test script is generated. The information contained in the plain load test script is correlated and used to generate a correlated load test script. The correlated load test script can then be used to perform load tests of the one or more websites that are accessed by the transactions of the transaction records included in the correlated load test script.

An example file used to store an archive of transaction records is a HAR file. In an example embodiment, the HAR file is a log of web browser's transactions with a website. The archive of transaction records can be received from a device such as the device the web browser was running on. The archive of transaction records can also be received over a network. Each web browser transaction includes a request to access a resource on a website specified by a domain name included in the request. The resource may be on servers associated with the website specified by the domain name included in the request (e.g., stored on a server). "Access" as used herein means to get to particular data on a source of data and/or get to a location of a source of data. For example, Web access means having a connection to the World Wide Web through an access provider or an online server provider. "Access" may also refer to the permission to use, or simply to use or perform any operation associated with, a resource. For example, performing an operation associated with a resource can include adding new data, adding a new resource on a specified source of data, replacing data, and/or deleting data. In some examples, the different operation can be performed at a specified location of a source of data. For example, the specified location of a source of data may be a server associated with a specific website. The resource the request is requesting to access may be static or dynamic. A static resource is a resource that is not manipulated at runtime of the web page. In some embodiments, a static resource is evaluated once by the element that refers them during the loading of the web page. Therefore, a static resource typically does not change. A dynamic resource can be manipulated at runtime of the web page are evaluated at runtime of the webpage. Therefore, a dynamic resource will typically change each time the website is accessed.

Organizing the archive of transaction records can include grouping transactions that are related. For example, multiple transactions may be performed when a URL is entered into a web browser. The transactions that are performed can be grouped together based on the URL being entered into the web browser. Additionally, the archive of transaction records may contain duplicate transaction records that can be removed. Transactions that include a request to access a static resource can also be removed from the archive of transaction records because the transactions that include a request to access a static resource do not need to be correlated for load testing.

Determining a collection of transaction records can be performed by receiving a selection of domain names. The selection of domain names is equivalent to required domain names. The archive of transaction records can be evaluated to determine available domain names from the domain names included in each request of the transaction records. The required domain names can be selected from the available domain names. The collection of transaction records is then determined by including each transaction in the archive that includes a request having a domain name that a corresponds to one of the required domain names.

Generating a plain load test script can be performed using the collection of transaction records. A plain load test script is a script that has not been correlated. Attempting to load test using a plain load test script may be impossible due to dynamic resources' changing values. The plain load test script may be generated by converting, for each transaction record in the collection, each request to a formatted request and converting each response to a formatted response. Converting the request can include converting any part of the request, including the request header, the request cookie, the request query parameter, and/or the request body. Converting the response can include converting any part of the response, including the response header, the response cookie, and/or the response body. The conversion process can include removing null characters, performing a decoding operation, and/or performing an unescape operation on any part of the request and/or response.

Generating the plain load test script can additionally include updating one or more templates using the formatted requests, formatted responses, and/or any other required information. The updated template(s) can be used so the plain load test script is formatted and/or structured correctly when the template(s) are used to generate the plain load test script. Updating the template(s) includes replacing, adding, and/or removing information from the template. As a result, the updated template(s) includes information that can be used to generate a plain load test script when the template(s) are accessed. In examples, the templates may include a test plan template, footer template, header manager template, sample request template, thread group template, and/or a transaction controller template. For example, a test plan template is a template that is used to define what users or transactions will be included in the plain load test script. A thread group template is used to define how many users or transactions will access a server simultaneously in the plain load test script. A transaction controller template includes multiple requests that will be used in the plain load test script. The transaction controller template can also group the requests, such as grouping the requests that occur for a specific action, such grouping the request that occur when selecting an input on a website. A sample request template can include information about the request including the request method, the domain name in the request, the host name, the request query parameters, the request body, and so on. A header manager template can include information about the request headers.

In an example, a header manager template that is not updated is:
</HTTPSamplerProxy>
<hashTree>

```
<HeaderManager          guiclass="HeaderPanel"
testclass="HeaderManager"
testname="MyHTTPHeaderManager" enabled="true">
<collectionProp name="HeaderManager.headers">
HEADERCOLLECTION
</collectionProp>
</HeaderManager>
<hashTree/>
</hashTree>
```

Updating the header manager template may include replacing the value of "testname" with a new value such as a test name for the desired test the correlated load test script is meant to perform once generated and replacing the value "HEADERCOLLECTION" with a new value such as the request header of the request so the template includes the information needed to be used to generate the plain load test script.

Updating the template(s) can include performing an illegal character conversion operation. The illegal character conversion operation may include removing null characters, removing invalid characters, and performing a decoding operation. The illegal character conversion operation is described in more detail herein with respect to FIGS. 6 and 9.

Correlation involves processing dynamic resources to ensure that a correlated load test script can be used for load testing without failing. Correlation extracts and stores the dynamic resource, also referred to as a correlation value, in the response of the transaction record to be used in subsequent requests, such as a request performed during load testing. Correlating the plain load test script to generate a correlated load test script may include determining a position of a correlation value in the response, extracting the correlation value, and/or saving the correlation value as a response value for each request. Once the position of the correlation value is determined, the correlation value can be extracted from the position to be stored elsewhere, a boundary extraction method can be performed at the position, and/or a regular expression extraction method can be performed at the position. The correlation process may be performed in an order. The order may include correlating each transaction that has the most recent request and has not yet been correlated. The most recent request can be determined by determining a time each request in the plain load test script occurs and/or by using a request number. In some examples, one or more templates may be used to generate the correlated load test script. For example, a boundary extractor template and/or a regular expression template may be updated with the correlation value for each request and then used to save the correlation values in the correlated load test script.

Load Test Script Generation System Environment

FIG. 1A is a block diagram illustrating an example network environment 100 where a transaction including a request to access a resource may be implemented. In this example, the network environment 100 includes a user device 102, a network 104, a target website 106, servers 108, 110, 112, 114, and a request 120. In examples, the request 120 is an HTTP request. The request 120 may be initiated by inputting a URL into user device 102, such as via a web browser. When a URL is entered into a device to initiate a request, multiple requests to access resources may be initiated simultaneously. The following examples will refer to a URL initiating a single request, but the following discussion applies to both a single request and multiple requests resulting from inputting the URL into a device. In this example, there is only a single target website 106, but there may be multiple target websites that have any number of associated servers.

The user device 102 may be a device such as a personal computer or a smart phone. The user device 102 may be operated by a user that wants to access a resource by communicating over the network 104. The network 104 may be any network such as the Internet. The user device 102 may make a request 120 to access a resource, such as a resource stored on one of the servers 108, 110, 112, 114 of target website 106. In an example, the user device 102 makes the request 120, and the request includes a URL indicating the location of the resource. For example, the URL includes a domain name indicating the target website 106 and a path and/or webpage indicating the location of the resource, such as server 108. The user device 102 sends the request 120 via the network 104 to the server 108 or otherwise alerts the server 108 that the resource that is stored on server 108 wants to be accessed. In examples, the user device includes a user interface for a user of the user device 102 to initiate sending and/or receiving of information and/or initiating the processes of generating a collection of transaction records, generating a plain load test script, and/or generating a correlated load test script.

In examples, the request 120 includes a request header, one or more request cookies, and one or more request query parameters in addition to the URL. A request header includes information about the request such as the request method, described in more detail herein, the path and filename of the requested resource, the request protocol such as HTTP, the desired format of the response, the desired language, encoding information, and so on. The request header can also include the time the request was initiated. In an example, each piece of information in the request header is represented as a key and value pair. The key identifies what the information is, and the value is the data. For example, the request method information includes a key such as ":method:" identifying that the value pair associated with the key is a request method and the value indicates what the request method is such as "GET" or "POST".

A request cookie is a piece of data that indicates a stored cookie associated with the server that stores the resource. For example, a device may store cookies from previous transactions with the same server. The cookies are files of data stored on a device. The cookie can allow the website of the server to keep track of the device's activity. In an example, each request cookie in the request is represented as a key and value pair. For example, the key is "cookie:" identifying the associated value as a cookie.

A request query parameter includes information about the request to define specific content or actions based on the data included in the request. For example, the request query parameters may include the type of web browser used to initiate the request, query terms to filter what resource is requested, the encoding standard, and so on. The request query parameters may be appended to the URL input into the device. In an example, each piece of information in the request query parameters is represented as a key and value pair. For example, for type of web browser information, the key may be "sourceid:" identifying the associated value as the type of web browser and the value may be the web browser information such as "NetBrowser".

In examples, the request 120 additionally includes a request method. The request method may be included in the request header. Example request methods include GET, PUT, POST, HEAD, DELETE, CONNECT, OPTIONS, TRACE, and PATCH. The request method indicates to the server that stores the requested resource what the desired operation of the server is. For example, a request with a GET request method indicates a response including the resource should be sent to the device that sent the request. A request with a PUT request method indicates the resource should be replaced with a request payload included in the response. A request with a POST method indicates that a resource should be created at a specified server. A request with a DELETE method indicates the resource should be deleted from the server. A request with a CONNECT method indicates that a tunnel to the server that stores the resource should be established. A request with a PATCH method indicates that the resource should be modified. As used herein, to "access" a resource means any of the possible operations that a request method can indicate. Therefore, accessing a resource can include, receiving the contents of the resource, deleting the resource, replacing the resource, storing a new resource on a server, and so on.

A request can optionally include a request body. For example, if a request has a POST request method, the request will include a request post body. The request post body includes information such as data that should be created at the server indicated by the request. A request body may be a single-resource body or a multiple-resource body. A multiple-resource body will be multiple parts with each part containing different information related to a different resource. In an example, the data is sent in HyperText Markup Language (HTML) format.

Each request can additionally include a request number. In an example, a load test script generation system assigns or identifies a request number for each request. The request number can be used by the load test script generation system to identify a part of a requests as belonging to a specific request. For example, the load test script generation system 202 illustrated in FIG. 2 assigns, identifies, or otherwise obtains request numbers.

Figure 1B:
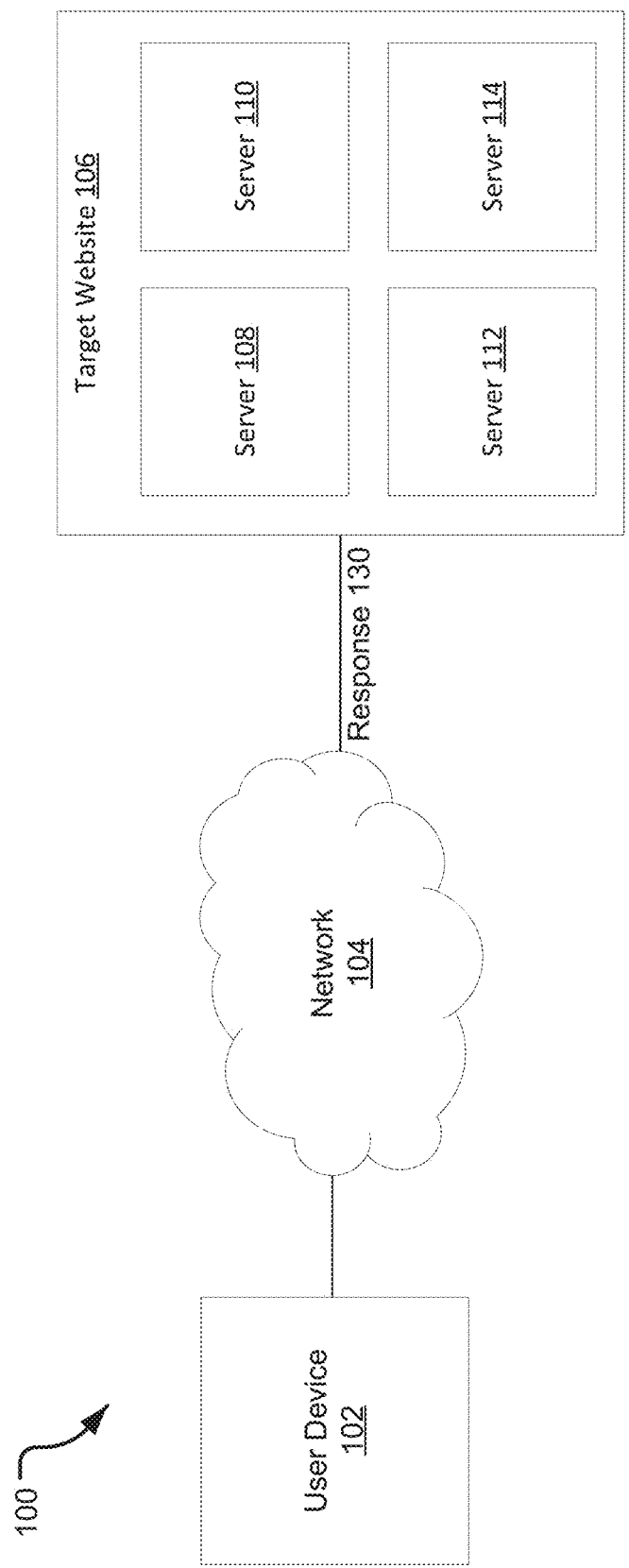
FIG. 1B is a block diagram illustrating an example network environment where a transaction including a response to a request to access a resource may be implemented.

FIG. 1B is a block diagram illustrating an example network environment 100 where a transaction including a response to a request to access a resource may be implemented. In this example, the network environment 100 includes a user device 102, a network 104, a target website 106, servers 108, 110, 112, 114, and a response 130. In examples, the response is an HTTP response. A response may be sent in reply to any number of requests sent by a device.

Response 130 is sent by the server indicated by the request 120 to the user device 102 via the network 104. In examples, the response 130 includes a response header, a response cookie, and a response body. A response header can include information about the response such as the server type, the location of the requested resource and/or the server, encoding information, the resource type, the time the response was sent, the time the response sent in a proxy server, and so on. A response cookie is a cookie sent from the server to be stored on the user device. A response body is optional depending on the associated request and/or request method. A response body may be a single-resource body or a multiple-resource body.

The user device 102 can download or otherwise obtain an archive of one or more transaction records. A transaction includes a request and a response to the request, and the transaction record is a record of said transaction. In examples, the user device initiates multiple transactions when entering a URL. The user device 102 can obtain an archive of the transaction records between a web browser of the user device 102 and servers of any target website, such as target website 106, the web browser sent requests to. For example, the user device may download, generate, or otherwise obtain a HAR file, an archive of transaction records between a web browser and websites.

Figure 2:
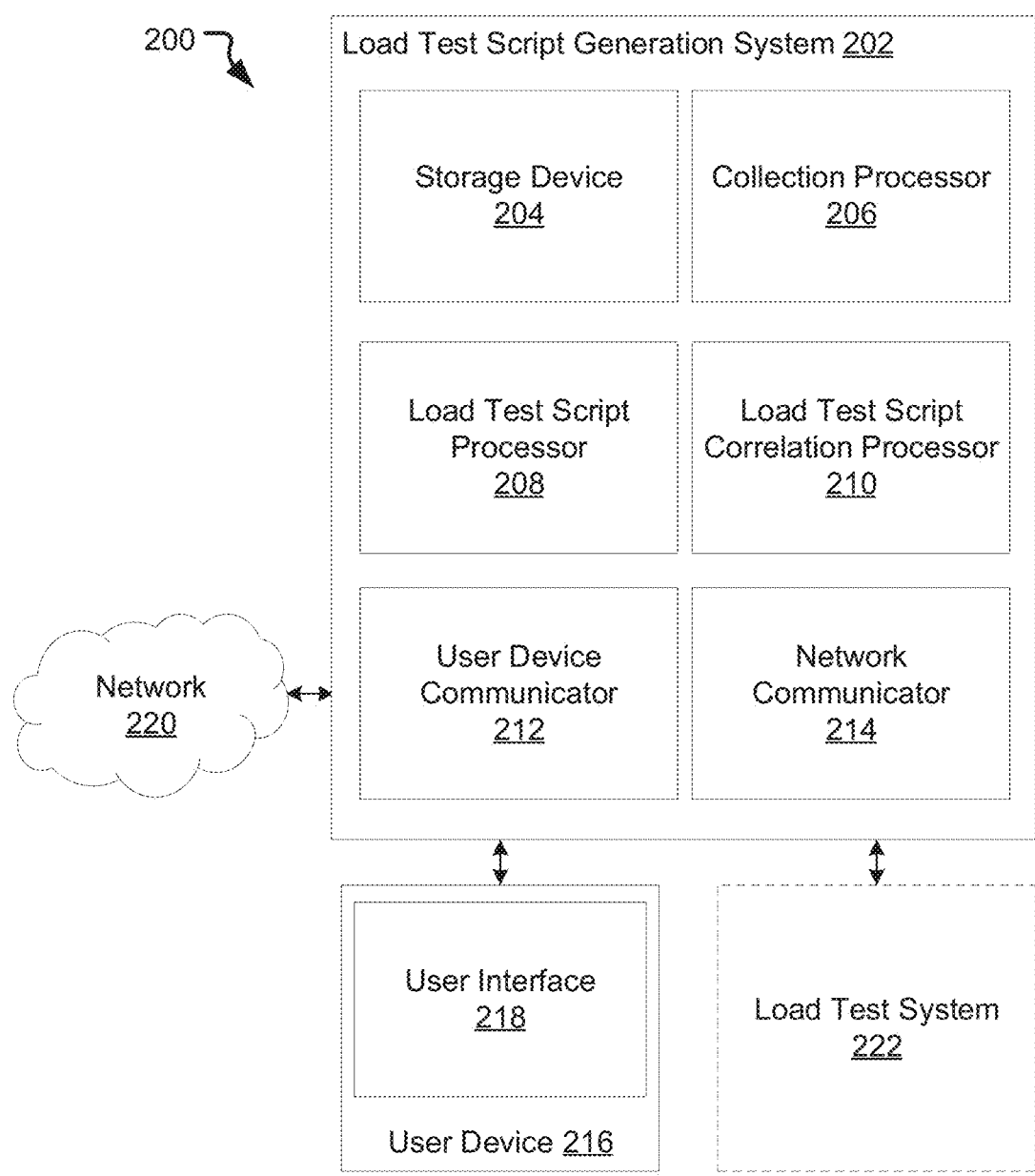
FIG. 2 is a block diagram illustrating an example load test script generation system environment.

FIG. 2 is a block diagram illustrating an example load test script generation system environment 200. The load test script generation system environment 200 includes a load test script generation system 202, a user device 216, a network 220 and, optionally, a load test system 222. The load test script generation system 202 may be implemented on any computing device, including as part of a user device such as user device 216. While a single user device is illustrated, multiple user devices may be present in other examples The load test script generation system 202 includes a storage device 204, a collection processor 206, a load test script processor 208, a load test script correlation processor 210, a user device communicator 212, and a network communicator 214. The storage device 204 stores instructions that can cause the collection processor 206, the load test script processor 208, and the load test script correlation processor 210 to perform different operations. The storage device 204 can also store archives of transaction records, collections of transaction records, plain load test scripts, and/or correlated load test scripts. In the present example, because the load test script generation system 202 is separate from the user device 216, the user device 216 can send and/or receive information to the storage device 204, such as the archives of transaction records, collections of transaction records, plain load test scripts, and/or correlated load test scripts, via the user device communicator 212. In an example, the user device communicator 212 communicates with the user device 216 via the network 220. In some examples, the load test script generation system 202 may be part of the user device 216. The network communicator 214 can communicate with the network 220 to receive and/or send information such as archives of transaction records, collections of transaction records, plain load test scripts, and/or correlated load test scripts. The received information can be stored on the storage device 204.

The user device 216 includes a user interface 218 for a user of the user device 216 to initiate sending and/or receiving of information and/or initiating the processes of generating a collection of transaction records, generating a plain load test script, and/or generating a correlated load test script.

The user device communicator 212 can receive or otherwise obtain archives of transaction records from the user device 216 to store on storage device 204. The collection processor 206 creates collections of transaction records. In an example, the collection processor 206 accesses an archive of transaction records stored on the storage device 204 or accesses an archive of transaction records stored on the user device 216 via the user device communicator 212. The collection processor 206 then creates a collection of transaction records from the transaction records in the accessed archive of transaction records. The process of creating a collection of transaction records will be described in more detail herein.

The load test script processor 208 generates plain load test scripts. A plain load test script is a script that is not correlated. The load test script processor 208 will access a collection of transaction records, such as by accessing a collection of transaction records stored on the storage device 204, and create a plain load test script using the accessed collection of transaction records. The process of creating a plain load test script will be described in more detail herein.

The load test script correlation processor 210 generates correlated load test scripts. The load test script correlation processor 210 will access a plain load test script, such as by accessing a plain load test script stored on the storage device 204, and create a correlated load test script using the plain load test script. The process of creating a correlated load test script will be described in more detail herein.

The load test system 222 performs load tests using the correlated load test scripts. The load test script generation system 202 can deliver correlated load test scripts to the load test system 222 so a load test can be performed using the delivered correlated load test script. A load test examines the speed, capacity, and/or other operating conditions of one or more target websites using the correlated load test script. The correlated load test script is used in the load test to simulate a load on the one or more target websites.

Correlated Load Test Generation Method

Figure 3:
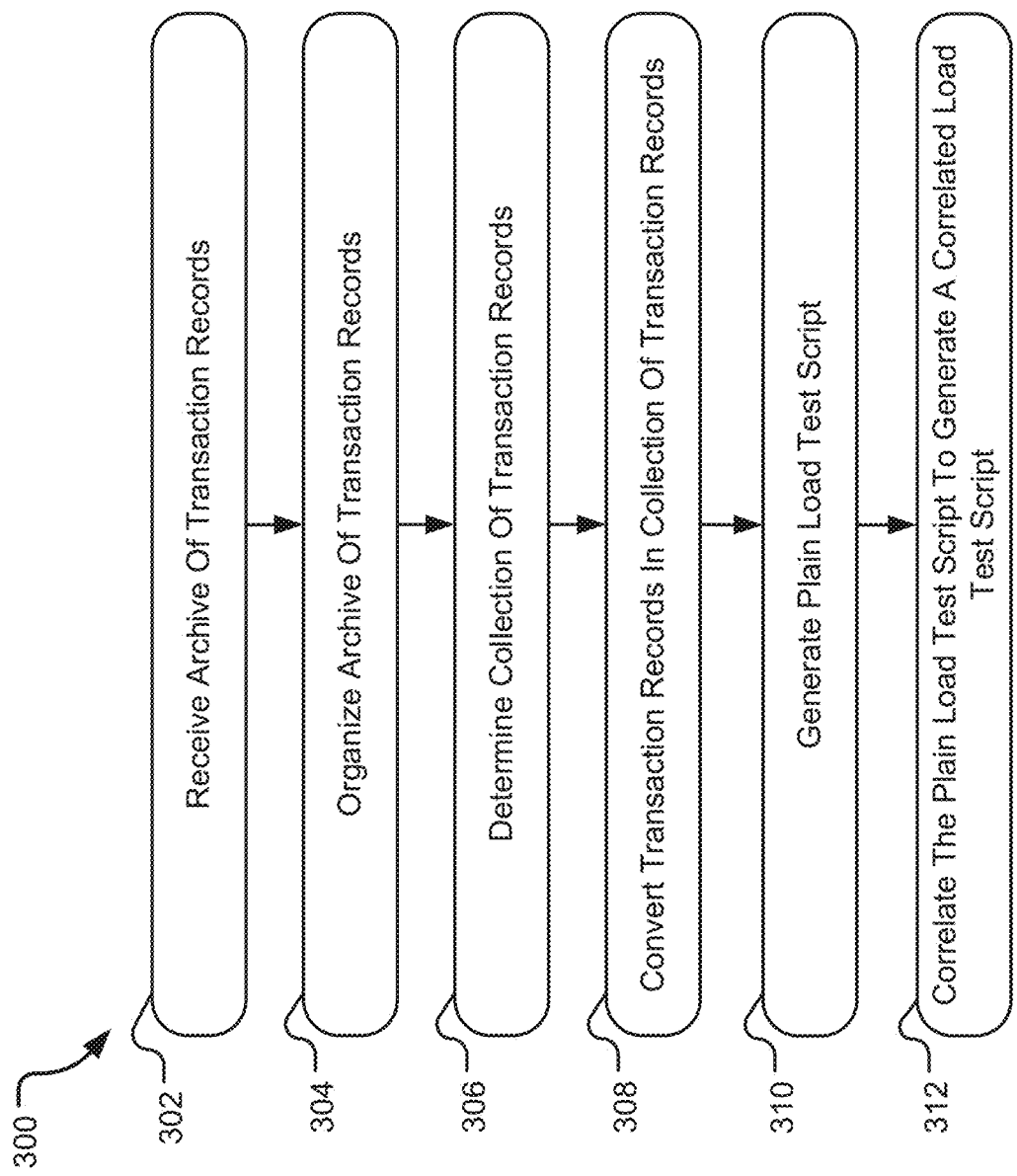
FIG. 3 is a flowchart illustrating an example method of generating a correlated load test script.

FIG. 3 is a flowchart illustrating an example method 300 of generating a correlated load test script. In examples, method 300 is performed by the load test script generation system 202 illustrated in FIG. 2. Method 300 begins at operation 302, and an archive of transaction records is received. The archive of transaction records includes records of transactions between a web browser and one or more websites. For example, the load test script generation system 202 receives the archive of transaction records from the user device 216 or network 220.

Once the archive of transaction records is received, the archive of transaction records is organized in operation 304. The transactions records in the archive are organized to prepare the transaction records to be used to generate a plain load test script file. Organizing the transaction records can include removing duplicate transactions in the archive, removing transactions that include a request to access a static resource, and/or grouping the transaction records. In an example, the archive of transaction records stored on the storage device 204 is altered. In another example, the archive of transaction records is not changed so that the archive can be used in the future and a copy of the archive of transaction records is updated by the operations of method 300. The copy of archive transaction records will be used in further operations of method 300 in this example. However, for brevity only the archive of transactions will be referred to, but the following discussion applies to both the archive of transaction records and/or the copy of the archive of the transaction records.

Figure 4:
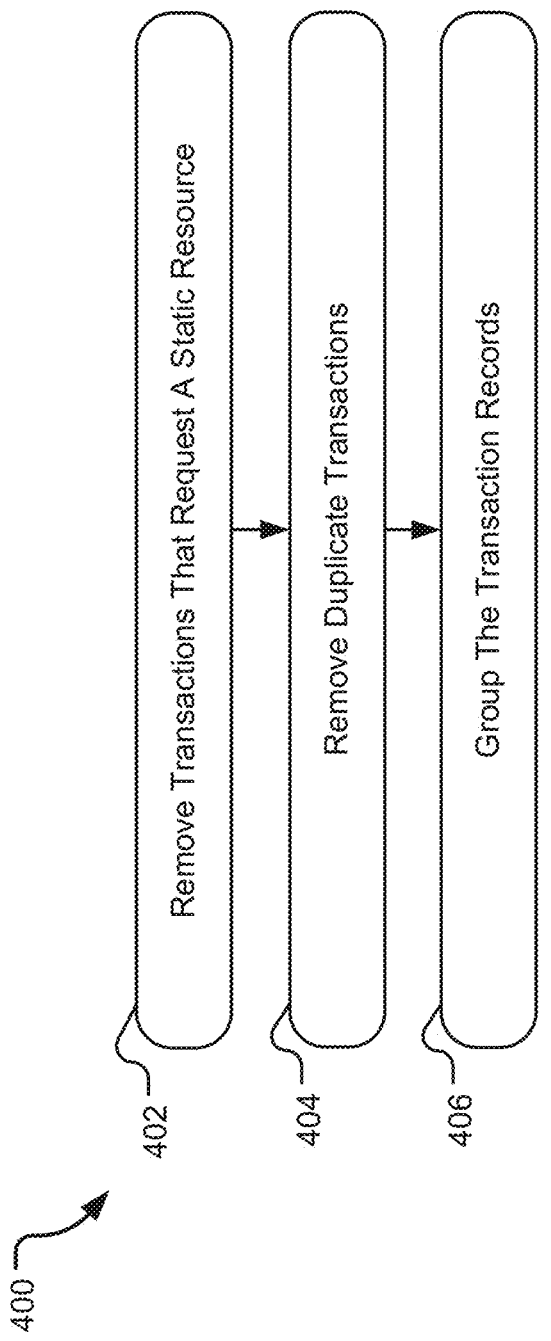
FIG. 4 is a flowchart illustrating an example method of organizing an archive of transaction records.

FIG. 4 is a flowchart illustrating an example method 400 of organizing an archive of transaction records. In examples, method 400 is performed by the load test script generation system 202 illustrated in FIG. 2. For example, collection processor 206 organizes the archive of transaction records. Beginning in operation 402, transaction records that include a request to access a static resource are removed. In an example, transaction records that include a request to access a static resource can be removed because correlation of these transaction records is not necessary to perform a successful load test. A load test of transaction records that include a request to access a static resource only needs to check that the response does not vary. In an example, the archive of transaction records stored on the storage device 204 is altered. In another example, the archive of transaction records is not changed so that archive can be used in the future and a copy of the archive of transaction records is updated by the operations of method 400.

Next, flow proceeds to operation 404, and any duplicate transactions in the archive are removed. For example, the collection processor 206 removes any duplicate transactions present in the archive. Duplicate transactions may be present for many reasons including inputting the same URL multiple times in the web browser to visit the website again.

Once duplicate transactions are removed, flow proceeds to operation 406, and the transaction records are grouped. For example, the collection processor 206 groups the transaction records. In an example, the transaction records are grouped based on a relationship between the transactions such as multiple transactions that were initiated by a single input of a URL. Inputting the URL to access a website can include multiple transactions that include requests for different resources at the website and multiple responses. In another example, the transactions have a relationship based on multiple transactions occurring based on an interaction with a website such as attempting to login to a website, trying to purchase something from the website, and so on.

Returning to FIG. 3, once the archive of transaction records is organized, such as by the operations in method 400, flow proceeds to operation 306, and a collection of transaction records is determined. For example, the collection processor 206 determines a collection of transaction records based on a selection of required domain names. In an example, the required domain names are selected by a user via user interface 218. The user can select domain names of a website that the user wishes to generate a correlated load test script for to load test the desired websites. The load test script generation system 202 can receive the required domain names via the user device communicator 212. The collection processor can then include each transaction record in the archive that includes a request to access a resource at the domain name of the websites that corresponds to one of the required domain names. Therefore, the collection will only include transactions that are interactions with desired websites. The collection of transaction records can also be determined by excluding from the collection any transaction record that has a request to access a static resource.

Figure 5:
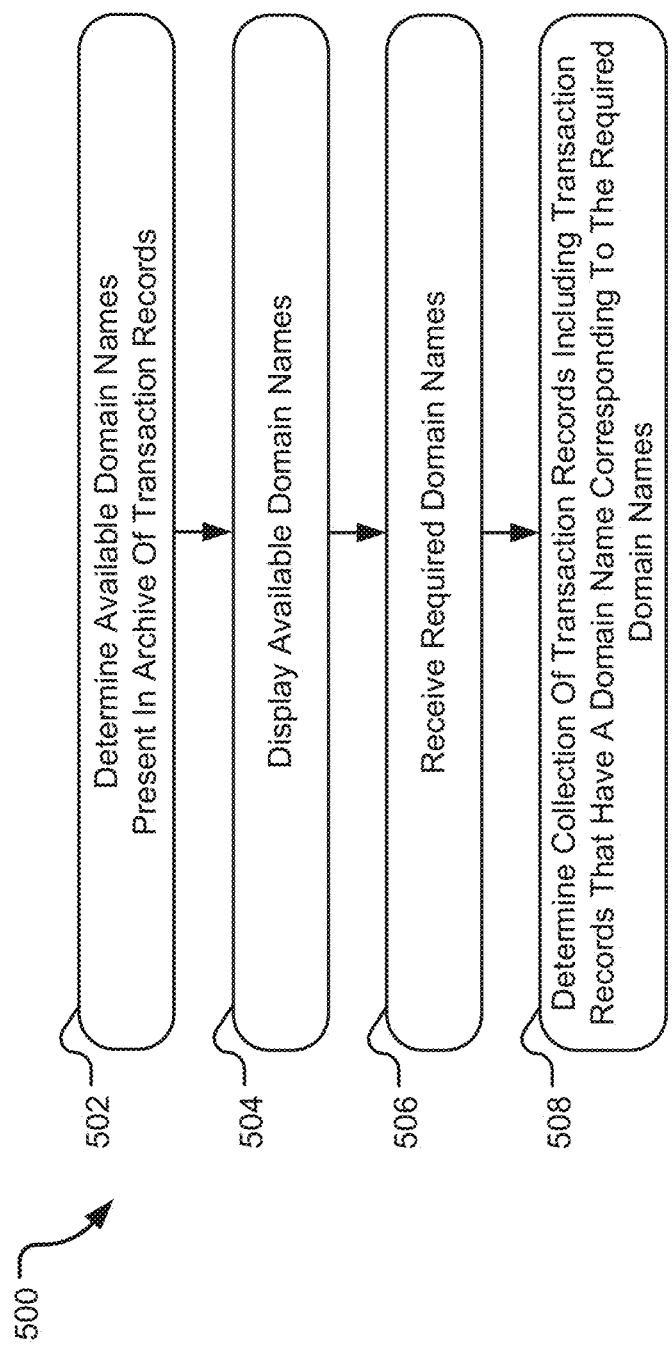
FIG. 5 is a flowchart illustrating an example method of determining a collection of transaction records.

Turning to FIG. 5, FIG. 5 is a flowchart illustrating an example method 500 of determining a collection of transaction records. In examples, method 400 is performed by the load test script generation system 202 illustrated in FIG. 2. For example, collection processor 206 determines a collection of transaction records using the archive of transaction records. In examples where a copy of the archive of transaction records is updated by the methods described, the copy of the archive will be used in method 500. Beginning in operation 502, available domain names present in the archive of transaction records is determined. For example, the collection processor 206 determines the domain names present in archive of transaction records by determining the domain name included in the request of each transaction record.

Once the available domain names are determined, flow proceeds to operation 504, and the available domain names are displayed. For example, the user device 216 receives the available domain names via the user device communicator 212. The user device 216 then displays the available domain name via the user interface 218.

A selection of required domain names is then received in operation 506. For example, a user of the user device 216 may select required domain names from the available domain names via the user interface 218. The load test script generation system 202 receives the required domain names via the user device communicator 212. In another example, the load test script generation system 202 may have previously stored the required domain names on the storage device 204 and does not need to communicate with the user device 216 to receive the required domain names.

Once the required domain names are received, the collection of transaction records is determined by including in the collection each transaction record in the archive that has a domain name corresponding to one of the required domain names in operation 508. For example, the collection processor 206 determines the collection by determining each transaction record in the archive of transaction records that has a domain name corresponding to one of the received required domain names.

Returning to FIG. 3, once the collection of transaction records is determined, such as by the operations in method 500, flow proceeds to operation 308. In operation 308, the transaction records are converted. For example, the load test script processor 208 converts the transaction records in the collection of transaction records determined in operation 306. Converting the transaction records includes converting, for each transaction record in the collection, each request to a formatted request and converting each response to a formatted response. Converting the request can include converting any part of the request, including the request header, the request cookie, the request query parameter, and/or the request body. Converting the response can include converting any part of the response, including the response header, the response cookie, and/or the response body. The conversion process can include removing null characters, performing a decoding operation, and/or performing an unescape operation on any part of the request and/or response.

Once the transaction records are determined, a plain load test script is generated in operation 310. For example, the load test script processor 208 generates a plain load test script using the collection of transaction records determined in operation 306 or operation 508. Generating the plain load test script includes updating one or more templates with the formatted requests and formatted responses so the plain load test script is formatted and/or structured correctly. A plurality of templates may be updated in operation 310. For example, the templates may include a test plan template, footer template, header manager template, sample request template, thread group template, and/or a transaction controller template as described above.

Generating the plain load test script can additionally include performing an illegal character conversion operation on the template. The illegal character conversion operation may include removing null characters, removing invalid characters, and performing a decoding operation. The illegal character conversion operation is described in more detail herein with respect to FIG. 9. In some examples, generating the plain load test script and converting the transaction records are done simultaneously or otherwise in a way that operations 308 and 310 are combined as a single operation. The process of generating a plain load test script will be described in more detail herein with respect to FIG. 6.

Once the plain load test script is generated, the plain load test script is correlated to generate a correlated load test script in operation 312. The correlation process processes dynamic resources to ensure that a correlated load test script can be used for load testing without failing. Correlation includes capturing, also referred to as extracting, and storing the dynamic resource, also referred to as a correlation value, in the response of the transaction record to be used in subsequent requests, such as a request performed during load testing. For example, the load test script correlation processor 210 will correlate the plain load test script generated in operation 310 to generate a correlated load test script. Correlating the plain load test script may include determining a position of a correlation value in the response, extracting the correlation value, and/or saving the correlation value as a response value for each request. Once the position of the correlation value is determined, the correlation value can be extracted from the position to be stored elsewhere, a boundary extraction method can be performed at the position, and/or a regular expression extraction method can be performed at the position. The correlation process may be performed in an order. The order may include correlating each transaction that has the most recent request and has not yet been correlated. The most recent request can be determined by determining a time each request in the plain load test script occurs and/or by using a request number. The process of correlating the plain load test script to generate a correlated load test script will be described in more detail herein with respect to FIG. 8. The generated correlated load test script can then be used by load test system 222 to perform load tests.

Figure 6:
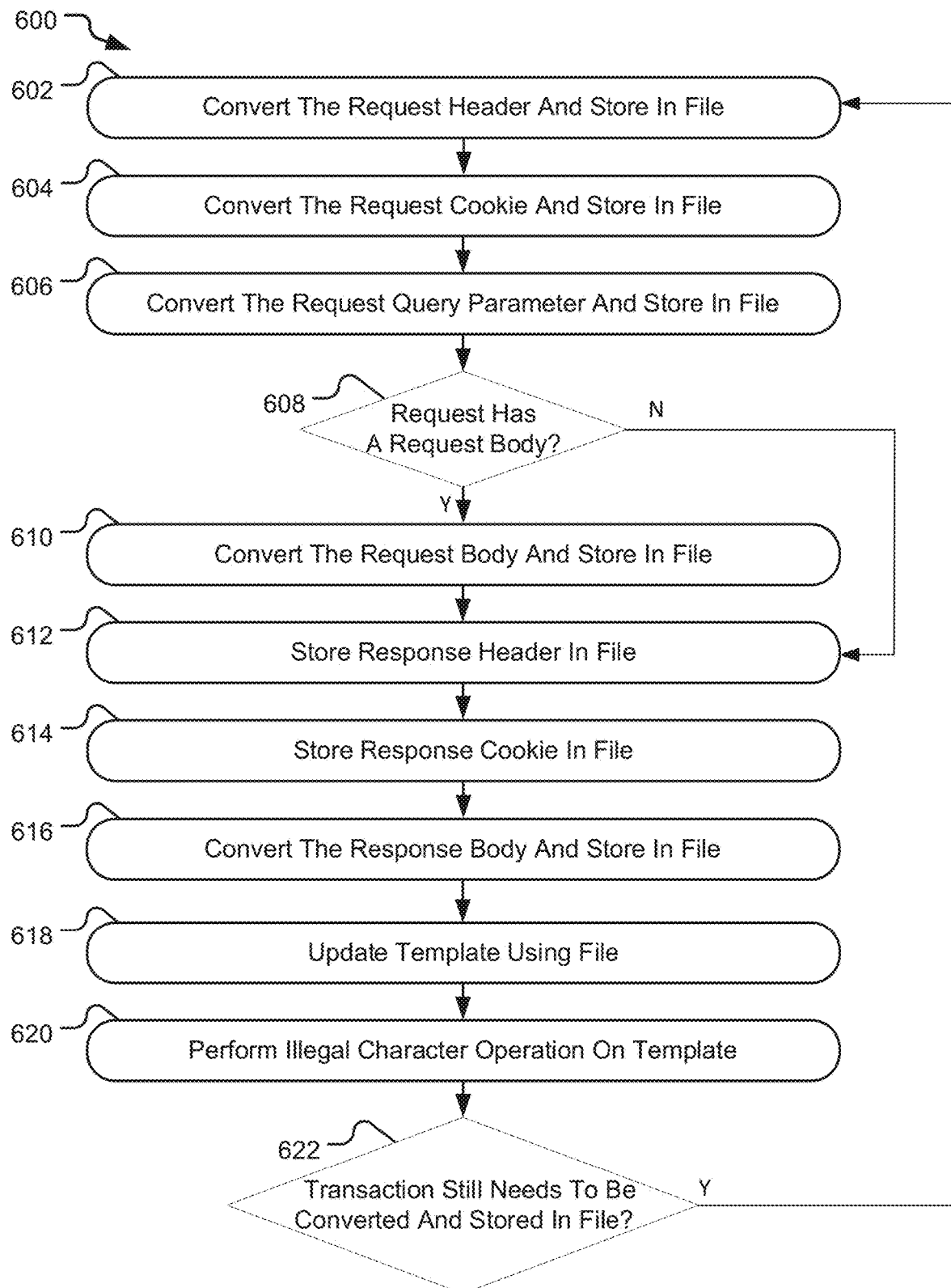
FIG. 6 is a flowchart illustrating an example method of generating a plain load test script.

FIG. 6 is a flowchart illustrating an example method 600 of generating a plain load test script. In examples, method 600 is performed by the load test script generation system 202. For example, method 600 is performed by load test script processor 208. Beginning in operation 602, for a request of a transaction in a collection of transactions, such as a collection generated in method 300 or method 500, the request header is converted to a formatted request header and stored in a file. For example, the load test script processor 208 converts the request header and stores the formatted request header in a file stored on storage device 204. Converting the request header includes reading a key and a value pair of each piece of information stored in the request header. The header may include multiple pieces of information such as a request method, a path and filename, the request protocol, and so on. The key identifies what the type of information is, and the value is the value of the information.

Figure 10:
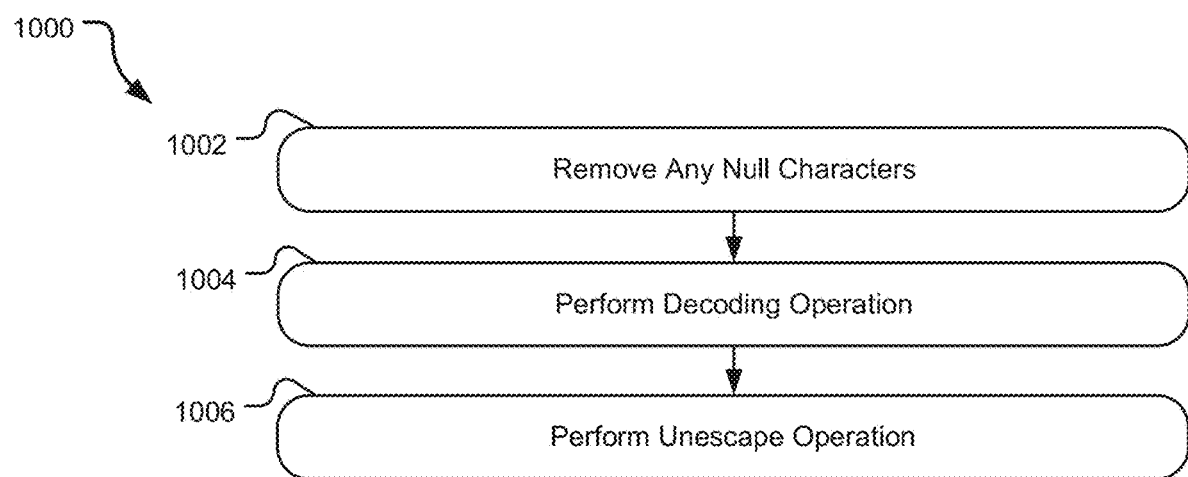
FIG. 10 is a flowchart illustrating an example method of performing a first value conversion operation.

Converting the request header includes performing a first value conversion operation on each value. An example method 1000 of performing a first value conversion operation is illustrated in FIG. 10 herein. In examples, the first value conversion operation includes removing any null character that is present, performing a decoding operation, and performing an unescape operation. In an example, the null character is "\000", and the load test script processor 208 removes any occurrence of the null character in each value. The decoding operation includes decoding each value for each piece of information. In an example, the decoding operation performed by the load test script processor 208 is a URL decoding operation performed on the value. For example, a URL decoding operation will replace an occurrence of "%21" with "!". The unescape operation includes unescaping the value of each value. In an example, the unescape operation replaces hexadecimal escape sequences present in the value with the character that the sequence represents. For example, performing an unescape operation on "http%3a//" would return "http://".

Once the first value conversion operation is performed, the formatted request header is stored in a file. For example, the load test script processor 208 stores the request header in a file stored on the storage device 204. The file may be used only to store the request headers of the transaction records or used for every part of the response and the request of the transaction records. For example, there may be a file that stores only formatted request headers, a file that stores only formatted request cookies, a file that stores only formatted request query parameters, a file that stores only formatted request bodies, a file that stores only formatted response headers, a file that stores only formatted response cookies, and a file that stores only formatted response bodies. For brevity, a single file that stores every part of request and the response of the transaction records will be referred to, but the following discussion applies to both files that store a single part of the request or response and a single file that stores every part of the request and the response.

In an example when multiple files are used to store parts of the requests and responses, the file can include the request number with each part of the request so the part can be identified as belonging to a specific request.

Proceeding to operation 604, a request cookie is converted to a formatted request cookie and stored in the file. For example, the load test script processor 208 converts the request cookie and stores the formatted request cookie in the file stored on the storage device 204. Converting the request cookie includes performing the first value conversion operation on each value of the cookie. For example, performing the first value conversion operation may be performed according to method 1000 illustrated in FIG. 10 herein. The load test script processor 208 then stores the formatted request cookie in a file stored on the storage device 204.

In operation 606, a request query parameter of the request is converted to a formatted request query parameter and stored in the file. For example, the load test script processor 208 converts the request cookie and stores the formatted request query parameter in the file stored on the storage device 204. Converting the request query parameter includes performing the first value conversion operation on each value of the query parameter. For example, performing the first value conversion operation may be performed according to method 1000 illustrated in FIG. 10 herein. The load test script processor 208 then stores the formatted request query parameter in a file stored on the storage device 204.

In operation 608, it is determined whether the request includes a request body. For example, the load test script processor 208 determines whether the request includes a request body. If the request has a request body, flow proceeds to operation 610, and the request body is converted to a formatted request body and stored. Converting the request body includes performing the first value conversion operation on each value of the request body. For example, performing the first value conversion operation may be performed according to method 1000 illustrated in FIG. 10 herein. The load test script processor 208 then stores the formatted request body in a file stored on the storage device 204.

Figure 7:
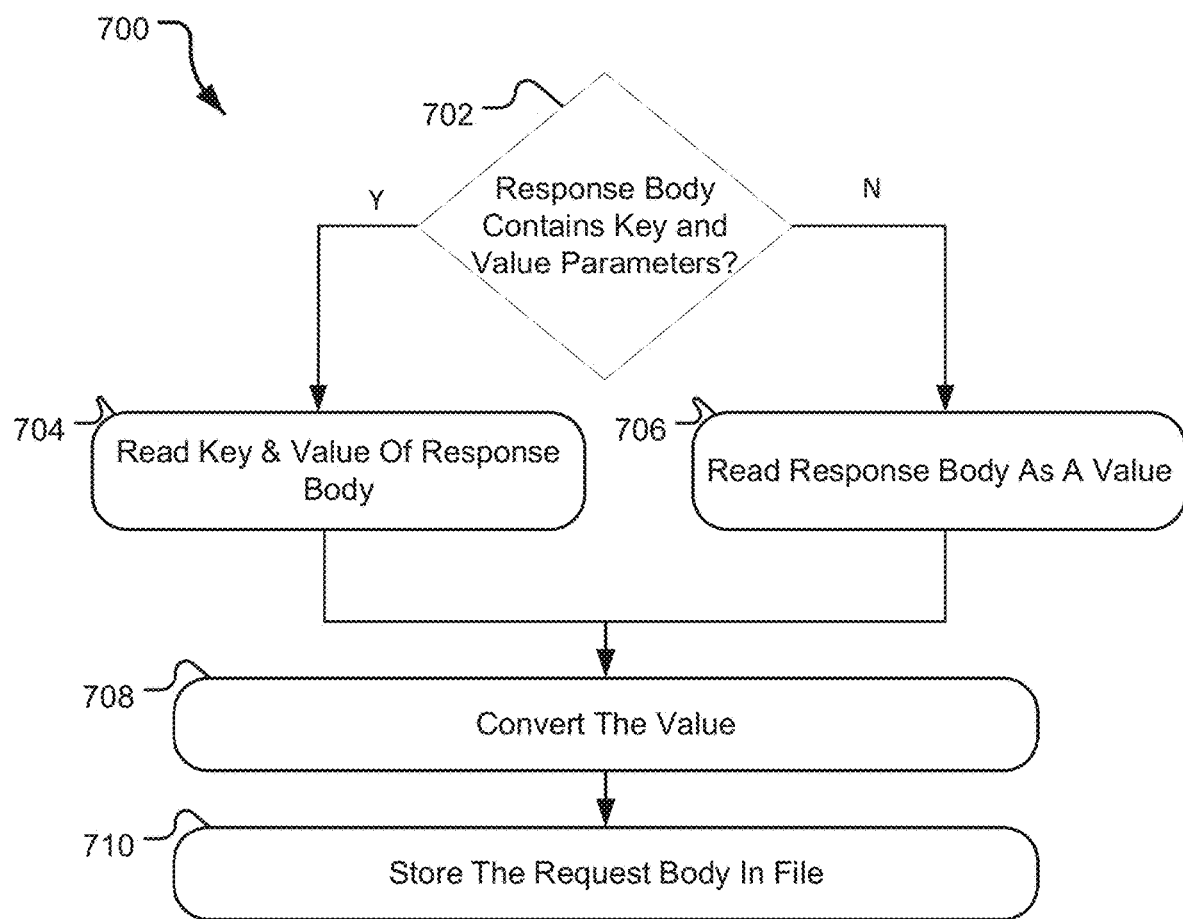
FIG. 7 is a flowchart illustrating an example method of converting a request post body.

FIG. 7 is a flowchart illustrating an example method 700 of converting a request post body. In examples, method 700 is performed by the load test script generation system 202. For example, method 700 is performed by load test script processor 208. In this example, the request has a POST request method. A request with a POST request method will include a response body that includes the information regarding the resource that should be created at the specified server. Beginning in operation 702, it is determined whether the response body contains a key and value pair parameter. For example, the load test script processor 208 determines whether the response body contains a key and value pair parameter. In an example, the response body contains multiple key and value pair parameters.

If the response body contains a key and value pair, flow proceeds to operation 704, and the key and value pairs response body are read, such as by the load test script processor 208. If the response body does not contain a key and value pair, flow proceeds to operation 706 and the response body is read as a value, such as by the load test script processor 208.

Flow then proceeds to operation 708 from operations 704 and 706, respectively. In operation 708 the values of the response body are converted to produce a formatted response body. For example, when the response body has key and value pairs, the load test script processor 208 converts each value by performing the first value conversion operation. An example method 1000 of performing a first value conversion operation is illustrated in FIG. 10 herein. When the response body does not include key value pairs, the load test script processor 208 converts the single value of the response body by performing the first value conversion operation.

The formatted request body is then stored in the file in operation 710. For example, the load test script processor 208 stores the formatted request body in a file stored on the storage device 204.

Returning to FIG. 6, once the request body is converted and stored in the file, flow proceeds to operation 612. Flow also proceeds to operation 612 if it is determined that the request does not include a request body in operation 608. In operation 612, the response header is stored in the file. For example, the load test script processor 208 stores the response header in a file stored on the storage device 204.

In operation 614, the response cookie of the response is stored in the file. For example, the load test script processor 208 stores the response cookie in a file stored on the storage device 204.

Figure 11:
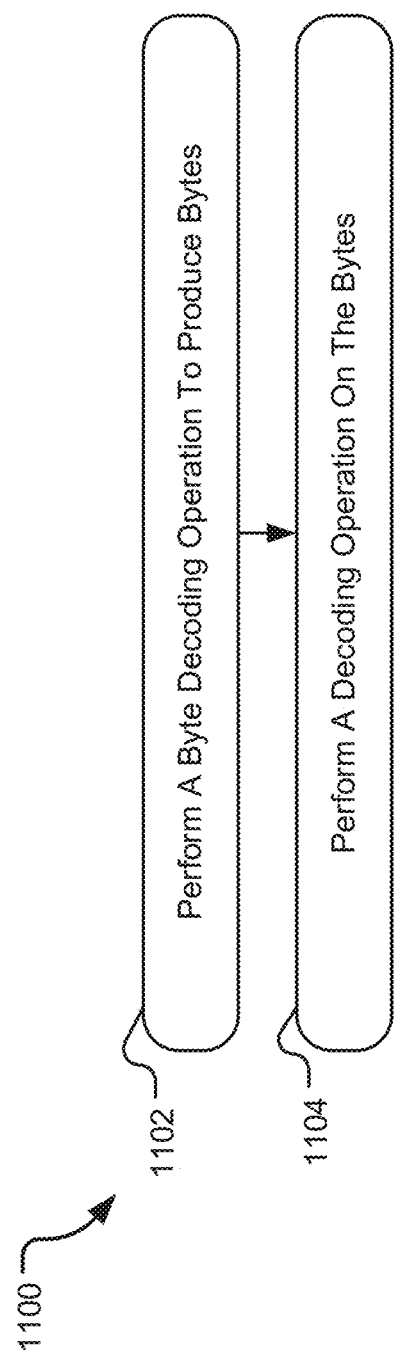
FIG. 11 is a flowchart illustrating an example method of performing a second value conversion operation.

In operation 616, the response body of the response is converted to produce a formatted response body and stored in the file. For example, the load test script processor 208 converts the response body and stores the formatted response body in the file stored on the storage device 204. Converting the request response body includes performing a second value conversion operation on the response body. An example method 1100 of performing a second value conversion operation is illustrated in FIG. 11 herein. The second value conversion operation includes performing a byte decoding operation to produce a plurality of bytes and performing a decoding operation on the produced plurality of bytes. In an example, the byte decoding operation is a MimeDecoding operation that converts the response body to a plurality of bytes. In an example, the decoding operation performed on the plurality of bytes is a Universal Coded Character Set Transformation Format-8-bit (UTF-8) decoding operation that converts the plurality of bytes to plain text. The load test script processor 208 then stores the formatted request query parameter in a file stored on the storage device 204.

In operation 618, a template is updated using the file. For example, the load test script processor 208 updates a template using the file stored on the storage device 204. In an example, the template is a file that structures the plain load test script so that the plain load test script may be correlated correctly and/or ensure that the generated correlated load test script is structured and/or formatted correctly for use in load testing. In an example, the updated template is stored as a new file that will be the generated plain load test script and the original template file is unaltered to be used again. Updating the template includes structuring and/or formatting the information stored in the file, including the formatted request headers, the formatted request cookies, the formatted request query parameters, the formatted request bodies, the response headers, the response cookies, and the formatted response bodies of each transaction record in the collection of transaction records. In examples, a plurality of templates is used when generating the plain load test script, so the plurality of templates or a portion of the plurality of templates may be updated in operation 618.

Figure 9:
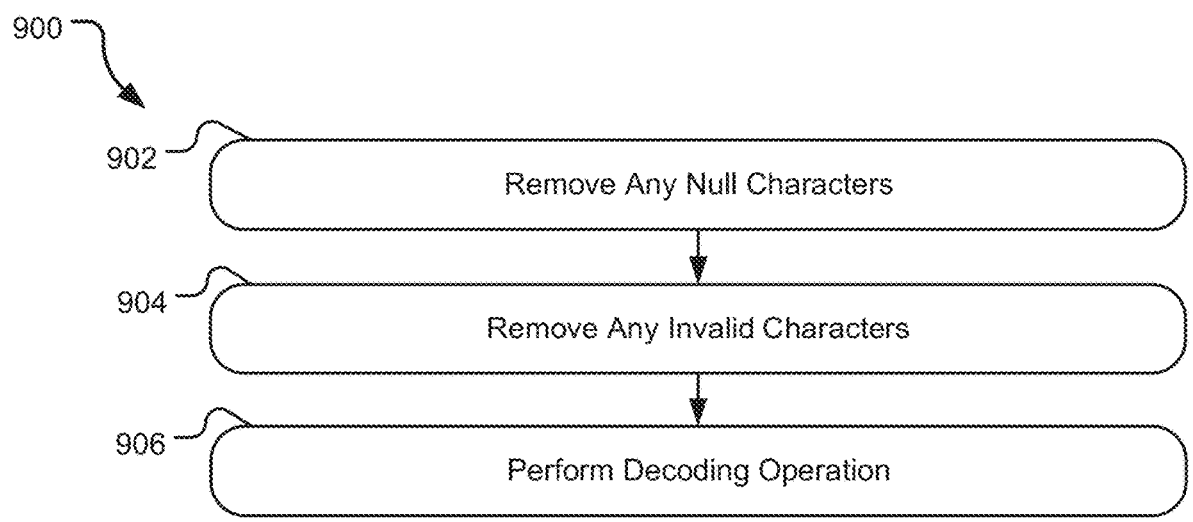
FIG. 9 is a flowchart illustrating an example method of performing an illegal character conversion operation.

Once the template is updated in operation 618, an illegal character conversion operation is performed on the template in operation 620. The illegal character conversion operation includes removing any instances of a null character that are present in the template, removing any instances of invalid characters that are present in the template, and performing a decoding operation. In an example, the null character is "\000", and the load test script processor 208 removes any instance of the null character from the template. In an example, the invalid characters include any character that does not match the American Standard Code for Information Interchange (ASCII) table, and the load test script processor 208 removes any instance of the invalid character from the template. In an example, the decoding operation is a URL decoding operation performed by the load test script processor 208. An example method 900 of performing an illegal character conversion operation is illustrated in FIG. 9.

In operation 622, it is determined whether another transaction needs to be converted and stored in the file. For example, the load test script processor 208 determines whether there is another transaction in the collection of transactions that needs to be converted and stored in the file. If is determined that another transaction needs to be converted and stored in the file, flow proceeds back to operation 602, and the operations are performed for the request and response of the transaction. In examples, the operations in method 600 are performed simultaneously and in different orders for multiple transactions, so operation 618 should not be understood to cause method 600 to perform operations on a single transaction at a time. If it is determined that there are no transactions that need to be converted and stored in the file, method 600 ends. The template then contains the required formatted information for the plain load test script file having the appropriate format and/or structure. The load test script processor may store the template on the storage device 204 as the generated plain load test script.

Figure 8:
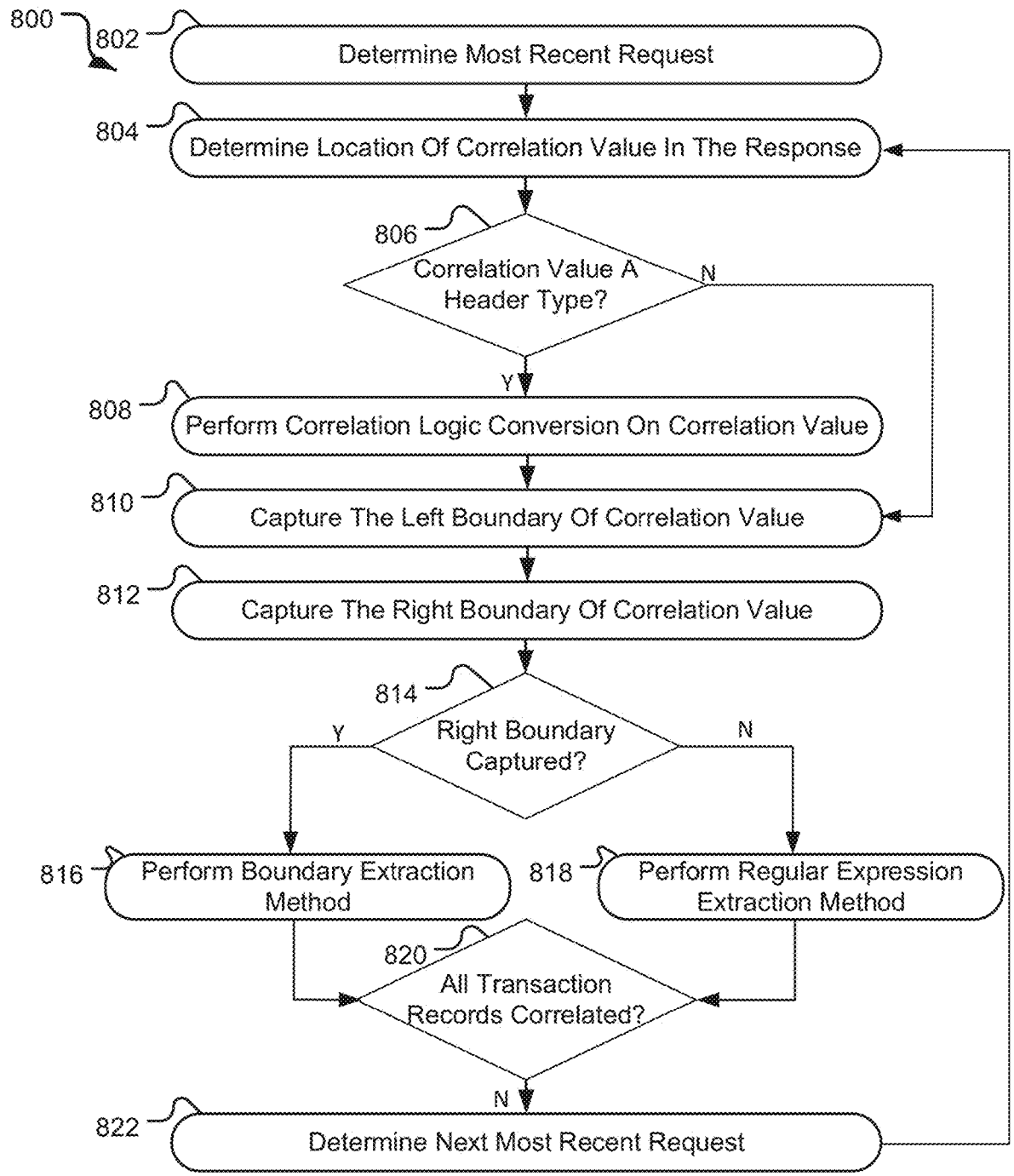
FIG. 8 is a flowchart illustrating an example method of correlating a plain load test script to generate a correlated load test script.

FIG. 8 is a flowchart illustrating an example method 800 of correlating a plain load test script to generate a correlated load test script. In examples, method 600 is performed by the load test script generation system 202. For example, method 800 is performed by load test script correlation processor 210. Method 800 may use the plain load test script generated in the methods described above such as method 300 or method 800. In examples, the plain load test script is updated to generate the correlated load test script. In other examples, a copy of the plain load test script is generated by the load test script correlation processor 210 and stored on the storage device 204. The copy of the plain load test script is updated to generate the correlated load test script in these examples.

Beginning in operation 802, the most recent request is determined. For example, the load test script correlation processor 210 determines the most recent request of the transaction records in the plain load test script. The load test script correlation processor 210 may determine the most recent request by determining the time each request occurs. In another example, the correlation processor 210 may use the request number of each request to determine the most recent request. The request number of each request may be ordered such that the correlation processor 210 can determine the most recent request using the request number.

In operation 804, the position of the correlation value in the response of the most recent request is determined. For example, the load test script correlation processor 210 determines the position of the correlation value in the response by iterating through the response to identify the correlation value. Determining the position allows the load test script correlation processor 210 to extract the correlation value from the position to be stored elsewhere, allow a boundary extraction method to be performed at the position, and/or allow a regular expression extraction method to be performed at the position. In an example, the correlation value is a dynamic value that is provided in response to the request.

In operation 806, it is determined whether the correlation value is a header value type. For example, the load test script correlation processor 210 determines whether the correlation value is in the response header of the response. If the correlation value is in the response header, the correlation is a header value type.

If it is determined that the correlation value is a header type, flow proceeds to operation 808 and a correlation logic conversion is performed on the correlation value, such as by load test script correlation processor 210. In an example, the correlation logic conversion includes replacing any character reference ampersand with an ampersand if the character reference ampersand is present in the correlation value, replacing any plus sign with an encoded string plus sign, and performing a decoding operation on the correlation value. In an example, the character reference ampersand is "&" and any instance of the character reference ampersand is replaced with an ampersand "&" by the load test script correlation processor 210. In an example, the plus sign is "+" and the plus sign is replaced with an encoded string plus sign "%2b" by the load test script correlation processor 210. In an example, the decoding operation is a URL decoding operation performed by the load test script correlation processor 210.

Once the correlation logic conversion is performed, flow proceeds to operation 810. Flow also proceeds to operation 810 if it is determined that the correlation value is not a header type in operation 806. In operation 810, the left boundary of the correlation value is captured. For example, the load test script correlation processor 210 captures the left boundary of the correlation value. The left boundary of the correlation value is the information to the left of the identified correlation value. For example, if the correlation value is located at this line in the response: "AccessId123=correlationvalue123", and the correlation value is "correlationvalue", the left boundary is "AccessId123".

In operation 812, the right boundary of the correlation value is captured. For example, the load test script correlation processor 210 captures the right boundary of the correlation value. The right boundary of the correlation value is the information to the right of the identified correlation value. In some examples, the load test script correlation processor 210 is not able to capture the right boundary. For example, there may be no information to the right of the identified correlation value. In an example, if the correlation value is located at this line in the response: "AccessId123=correlationvalue123", and the correlation value is "correlationvalue", the right boundary is "123".

In operation 814, it is determined whether the right boundary was captured. For example, the load test script correlation processor 210 determines whether the right value was captured. If the right boundary was captured, flow proceeds to operation 816, and a boundary extraction method is performed, such as by the load test script correlation processor 210. The boundary extraction method includes extracting the correlation value using the captured left boundary to determine the start of the correlation value and the captured right value to determine the end of the correlation value. The final step in the boundary extraction method includes updating the correlated load test script that is being generated by saving the correlation value as the response value to the request. In examples, a boundary extractor template is updated during the boundary extraction method. The boundary extractor template may be updated to include the correlation value. The updated boundary extractor template can be used to update the correlated load test script that is being generated.

If it is not determined that the right boundary is captured in operation 814, flow proceeds to operation 818, and a regular expression extraction method is performed, such as by the load test script correlation processor 210. The regular expression extraction method includes extracting the correlation value using the captured left boundary to determine the start of the correlation value and a regular expression to determine when the correlation value ends. The final step in the regular expression extraction method includes updating the correlated load test script that is being generated by saving the correlation value as the response value to the request. In examples, a regular expression template is updated during the regular expression extraction method. The regular expression template may be updated to include the correlation value. The updated regular expression extractor template can be used to update the correlated load test script that is being generated.

Once the boundary extraction method is performed in operation 816 and/or the regular expression extraction method is performed in operation 818, flow proceeds to operation 820. In operation 820, it is determined if all transaction records in the plain load test script are correlated, such as by the load test script correlation processor 210. If it is determined that all transaction records in the plain load test script are correlated, method 800 ends, and the correlated load test script generation process is complete.

If it is determined that not all transaction records in the plain load test script are correlated, flow proceeds to operation 822, and the most recent request of the transactions that still need to be correlated is determined. For example, the load test script correlation processor 210 determines the most recent request of the transaction records in the plain load test script that have not been correlated using the methods described with respect to operation 802.

Once the most recent request remaining to be correlated is determined, flow proceeds back to operation 804, and the operations are performed on the currently determined transaction. For example, the load test script correlation processor 210 performs operations of method 800 on the currently determined transaction.

FIG. 9 is a flowchart illustrating an example method 900 of performing an illegal character conversion operation. In examples, the load test script generation system 202 illustrated in FIG. 2 performs the illegal character conversion operation method 900. For example, the load test script processor 208 may perform method 900 on a template used to create a plain load test script. However, the illegal character conversion can be performed on any desired file or otherwise, such as a part of a request, a part of a response, a template, a plain load test script, and/or a correlated load test script. The operations of method 900 will be described as being performed on a general file, but the method 900 also applies to requests, responses, templates, and load test scripts.

Beginning in operation 902, any null characters that are present in the file are removed. For example, the load test script generation system 202 removes any null characters present in the file. In examples, the null character is "\000", and the load test script generation system 202 removes any instance of the null character from the file.

In operation 904, any invalid characters that are present in the file are removed. For example, the load test script generation system 202 removes any invalid characters present in the file. In an example, the invalid characters include any character that does not match the American Standard Code for Information Interchange (ASCII) table. Therefore, the load test script generation system 202 removes any instance of the invalid character from the file.

Flow then proceeds to operation 906, and a decoding operation is performed. For example, the load test script generation system 202 performs a decoding operation on the file. In an example, the decoding operation is a URL decoding operation. For example, a URL decoding operation will replace an occurrence of "%2F" with "/".

FIG. 10 is a flowchart illustrating an example method 1000 of performing a first value conversion operation. In examples, the load test script generation system 202 illustrated in FIG. 2 performs the first value conversion operation method 1000. For example, the load test script generation system 202 may perform method 1000 on any desired file or otherwise, such as a part of a request, a part of a response, a template, a plain load test script, and/or a correlated load test script. The operations of method 1000 will be described as being performed on a general file, but the method 1000 also applies to requests, responses, templates, and load test scripts.

Beginning in operation 1002, any null character that is present is removed, such as by the load test script generation system 202. In an example, the null character is "\000", and the load test script generation system 202 removes any occurrence of the null character in the file.

A decoding operation is performed in operation 1004, such as by the load test script generation system 202. In an example, the decoding operation is a URL decoding operation. For example, a URL decoding operation will replace an occurrence of "%3F" with "?".

In operation 1006, an unescape operation is performed. For example, the load test script generation system 202 performs the unescape operation on the file. The unescape operation includes unescaping any required part of the file. In an example, the unescape operation replaces hexadecimal escape sequences present in the file with the character that the sequence represents.

FIG. 11 is a flowchart illustrating an example method 1100 of performing a second value conversion operation. In examples, the load test script generation system 202 illustrated in FIG. 2 performs the second value conversion operation method 1100. For example, the load test script generation system 202 may perform method 1100 on any desired file or otherwise, such as a part of a request, a part of a response, a template, a plain load test script, and/or a correlated load test script. The operations of method 1100 will be described as being performed on a general file, but the method 1100 also applies to requests, responses, templates, and load test scripts.

Beginning in operation 1102, a byte decoding operation is performed on a file to produce bytes, such as by the load test script generation system 202. For example, the byte decoding operation decodes the file to produce a plurality of bytes. In an example, the byte decoding operation is a MimeDecoding operation that converts the file to a plurality of bytes.

In operation 1104, a decoding operation is performed on the bytes produced in operation 1102, such as by the load test script generation system 202. In an example, the decoding operation performed on the plurality of bytes is a Universal Coded Character Set Transformation Format-8-bit (UTF-8) decoding operation that converts the plurality of bytes to plain text.

User Interface

Figure 12:
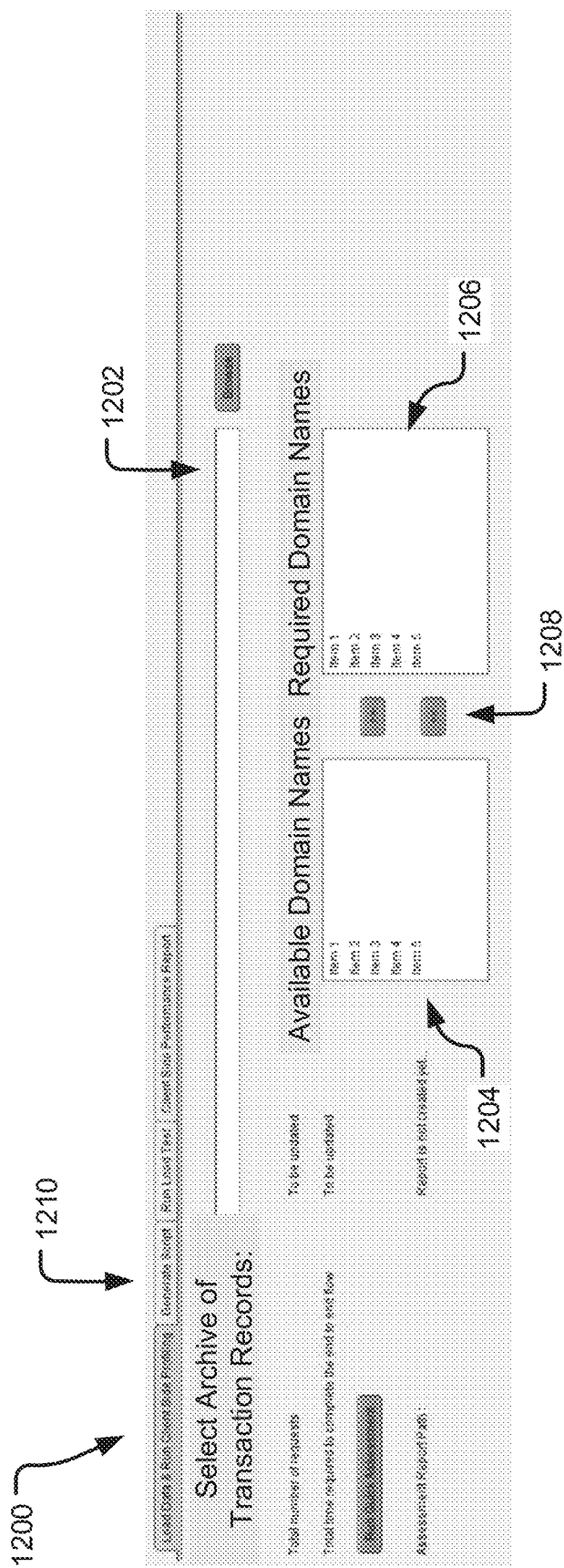
FIG. 12 is an example user interface page for a load test script generation system.

FIG. 12 is an example user interface page 1200 for a load test script generation system. The user interface page 1200 includes an archive of transaction records input 1202, an available domain name list 1204, a required domain name list 1206, a domain name selection input 1208, and a generate load test script tab 1210. In an example, the user interface page 1200 is displayed on user interface 218 illustrated in FIG. 2.

The archive of transaction records input 1202 is an input that allows a user of a device displaying the user interface page 1200 to select an archive of transaction records. For example, a user of user device 216 may select an archive of transaction records using the archive of transaction records input 1202 via user interface 218. The load test script generation system 202 can receive the selected archive of transaction records via user device communicator 212. In examples, this selection process via user interface page 1200 is how the archive of transaction records is received in operation 302 of method 300 described above.

The available domain name list 1204 is a list of available domain names. For example, the user interface 218 displays the list of available domain name in the archive of transaction records selected via the archive of transaction records input 1202. In an example, the available domain name list 1204 is displayed on the user interface page 1200 via operations 502 and 504 of method 500 described above.

The required domain name list 1206 is a list of required domain names for the load test generation process that will be performed. In an example, the required domain name list 1206 is selected by a user of a device displaying the user interface page 1200 via the domain name selection input 1208. In an example, a user of user device 216 selects the required domain names via the domain name selection input 1208 from the user interface page 1200 displayed on the user interface 218. In an example, the required domain name list 1206 is received by the load test script generation system 202 via the user device communicator 212, such as how the required domain names are received in operation 506 of method 500 described above.

The generate load test script tab 1210 is a tab that is selectable to display a different user interface page. For example, when the generate load test script tab 1210 is selected, the user interface will display user interface page 1300.

Figure 13:
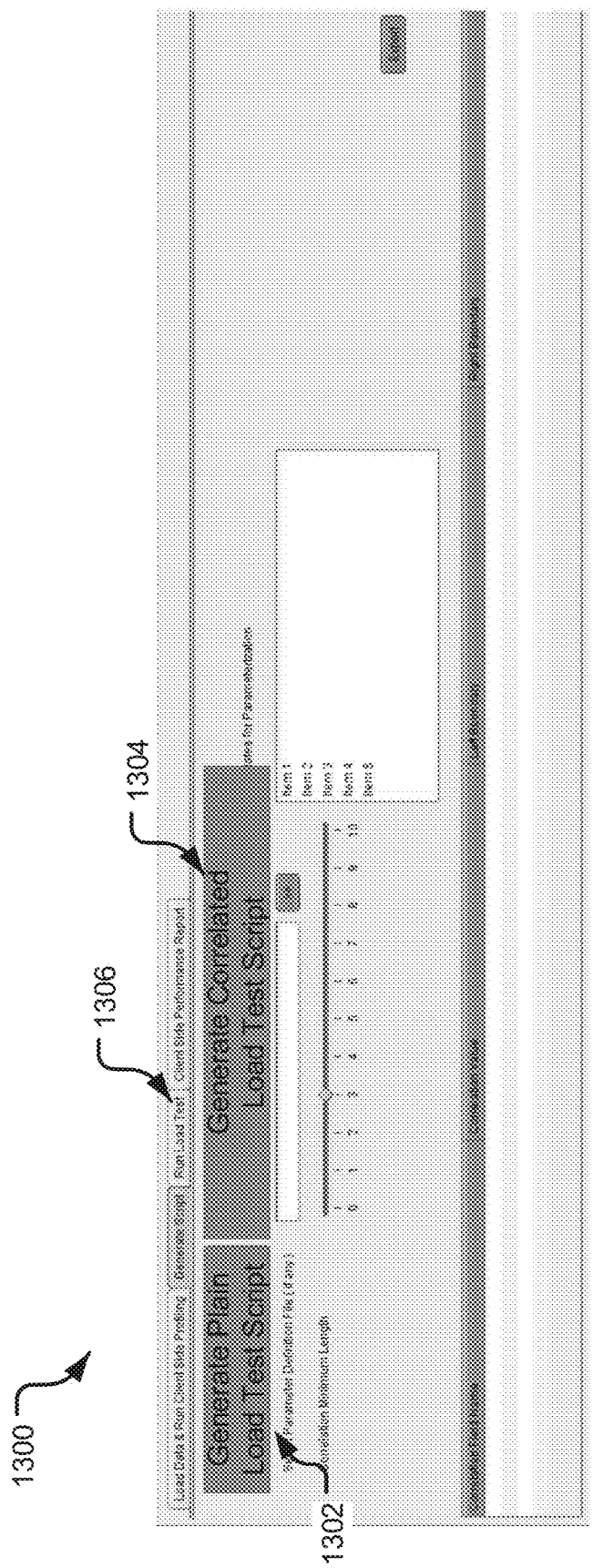
FIG. 13 is an example user interface page for a load test script generation system.

FIG. 13 is an example user interface page 1300 for a load test script generation system. The user interface page 1300 includes a generate plain load test script input 1302, a generate correlated load test script input 1304, and a run load test tab 1306, In an example, the user interface page 1300 is displayed on user interface 218 illustrated in FIG. 2.

The generate plain load test script input 1302 is an input that allows a user of a device displaying the user interface page 1300 to request a plain load test script be generated using a selected archive of transaction records. For example, a user of user device 216 will select the generate plain load test script input 1302 via the user interface page 1300 displayed on user interface 218, and the plain load test script will be generated according to method 600 described above.

The generate correlated load test script input 1304 is an input that allows a user of a device displaying the user interface page 1300 to request a correlated load test script be generated using a selected archive of transaction records. For example, a user of user device 216 will select the generate correlated load test script input 1304 via the user interface page 1300 displayed on user interface 218, and the correlated load test script will be generated according to method 800 described above.

The run load test tab 1306 is a tab that is selectable to display a different user interface page. For example, when the run load test tab 1306 is selected, the user interface will display a user interface page with an input that will run a load test using a generated correlated load test script. In an example, when the input that will run a load test is selected, the load test system 222 shown in FIG. 2 will perform a load test using a correlated load test script.

Examples of the present disclosure include various steps, which are described in this specification. The example embodiments described herein may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more memory cards (e.g., flash memory) for program and data storage, and a random access memory, for temporary data and program instruction storage. From a software standpoint, a CPU typically includes software resident on a storage media (e.g., a memory card), which, when executed, directs the CPU in performing transmission and reception functions. The CPU software may run on an operating system stored on the storage media, such as, for example, UNIX or Windows, iOS, Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine accessible or machine readable medium may be used to program a computer system or other electronic device. The machine-readable medium may include, but is not limited to, optical disks, CD-ROMs, and magneto-optical disks or other type of media/machine- readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Various modifications and additions can be made to the exemplary examples discussed without departing from the scope of the present invention. For example, while the examples described above refer to particular features, the scope of this invention also includes examples having different combinations of features and examples that do not include all of the described features. Accordingly, the scope of the present invention is intended to embrace all such alternatives, modifications, and variations together with all equivalents thereof.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and such references mean at least one of the examples.

Reference to "one example" or "an example" means that a particular feature, structure, or characteristic described in connection with the example is included in at least one example of the disclosure. The appearances of the phrase "in one example" in various places in the specification are not necessarily all referring to the same example, nor are separate or alternative examples mutually exclusive of other examples. Moreover, various features are described which may be exhibited by some examples and not by others. It should also be understood that reference to the various examples described herein does not limit the scope of the claims attached hereto. Additionally, any examples set forth in this specification are not intended to be limiting and merely set forth some of the many possible examples for the appended claims.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various examples given in this specification.

Without intent to limit the scope of the disclosure, examples of instruments, apparatus, methods, and their related results according to the examples of the present disclosure are given above. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

What is claimed is:

1. A computer-implemented method for load test script generation, comprising:
    receiving an archive of one or more transaction records between one or more web browsers and one or more servers, wherein each transaction record includes:
        a request to access a resource stored on a server of the one or more servers including a web address comprising a domain name identifying a location of the resource, and
        a response to the request to access the resource;
    generating a list of each domain name included in each request of the archive of one or more transaction records;
    displaying the list for selection by a user;
    receiving a selection of one or more domain names from the list;
    determining one or more domain names identifying a portion of a network address belonging to a particular domain based on the selection of one or more domain names, thereby generating one or more required domain names;
    determining a collection of transaction records, the collection comprising each transaction record of the archive having the domain name of the request corresponding to the one or more required domain names;
    generating a plain load test script including each transaction record in the collection of transaction records, generating the plain load test script comprising:
        converting the request of each transaction record in the collection of transaction records to a formatted request, and
        converting the response of each transaction record in the collection of transaction records to a formatted response; and
    correlating the plain load test script to generate a correlated load test script.

2. The method of claim 1, wherein determining the collection of transaction records further comprises excluding from the collection any transaction record wherein the resource is static.

3. The method of claim 1, wherein converting the request of each transaction record in the collection of transaction records to the formatted request comprises:
    if a null character is present in the request, removing the null character;

performing a decoding operation on the request; and
performing an unescape operation on the request to replace a hexadecimal escape sequence present in the request with a character that the hexadecimal sequence represents.

4. The method of claim 1, wherein converting the response of each transaction record in the collection of transaction records to the formatted response comprises:
performing a byte decoding operation on the response to produce a plurality of bytes; and
performing a decoding operation on the plurality of bytes.

5. The method of claim 1, wherein generating the plain load test script further comprises:
storing the formatted request of each transaction record in a file;
storing the formatted response of each transaction record in the file; and
updating a template using the file.

6. The method of claim 5, wherein updating the template further comprises performing an illegal character conversion operation.

7. The method of claim 6, wherein performing the illegal character conversion operation comprises:
if a null character is present in the template, removing the null character;
if an invalid character is present in the template, removing the invalid character; and
performing a decoding operation.

8. The method of claim 5, wherein correlating the plain load test script to generate the correlated load test script comprises:
determining a time each request in the plain load test script occurs; and
using the template, correlating each transaction record in the collection in an order based on the time of each request in the plain load test script occurs, correlating each transaction record comprising:
evaluating the formatted response to identify a position of a correlation value;
capturing a left boundary of the correlation value;
capturing a right boundary of the correlation value;
when the right boundary is able to be captured:
performing a boundary extraction method to extract the correlation value; and
when the right boundary is not able to be captured:
performing a regular expression extraction method to extract the correlation value.

9. The method of claim 8, wherein evaluating the formatted response to identify the correlation value comprises:
if the correlation value has a header value type, performing a correlation logic conversion comprising:
if a character reference ampersand is present in the correlation value, replacing the character reference ampersand with an ampersand;
if a plus sign is present in the correlation value, replacing the plus sign with an encoded string plus sign; and
performing a decoding operation on the correlation value.

10. A non-transitory computer-readable medium having stored thereon one or more sequences of instructions for causing one or more processors to perform:
receiving an archive of one or more transaction records between one or more web browsers and a plurality of servers, wherein each transaction record includes:
a request to access a resource stored on a server of the plurality of servers, wherein each request includes:
a request header;
a request cookie;
a request query parameter; and
a web address comprising a domain name identifying a location of the resource; and
a response to the request, wherein each response includes a response body;
generating a list of each domain name included in each request of the archive of one or more transaction records;
displaying the list for selection by a user;
receiving a selection of one or more domain names from the list;
determining one or more domain names identifying a portion of a network address belonging to a particular domain based on the selection of one or more domain names from the list, thereby generating one or more required domain names;
determining a collection of transaction records, the collection of transaction records comprising each transaction record of the archive having the domain name of the request corresponding to the one or more required domain names;
generating a plain load test script including each transaction record in the collection of transaction records, comprising:
converting the request of each transaction record in the collection of transaction records to a formatted request, comprising performing a first value conversion operation on:
the request header;
the request cookie; and
the request query parameter;
converting the response of each transaction record in the collection of transaction records to a formatted response, comprising performing a second value conversion operation on the response body; and
correlating the plain load test script to generate a correlated load test script.

11. The non-transitory computer-readable medium of claim 10, wherein correlating the plain load test script to generate the correlated load test script comprises:
determining a time each request in the plain load test script occurs; and
correlating each transaction record in the collection in an order based on the time of each request in the plain load test script occurs, correlating each transaction record comprising:
evaluating the formatted response to identify a position of a correlation value;
capturing a left boundary of the correlation value;
capturing a right boundary of the correlation value;
when the right boundary is able to be captured:
performing a boundary extraction method to extract the correlation value; and
when the right boundary is not able to be captured:
performing a regular expression extraction method to extract the correlation value.

12. The non-transitory computer-readable medium of claim 11, wherein determining the time each request in the plain load test script occurs comprises determining a request number of the request of each transaction record.

13. The non-transitory computer-readable medium of claim 11, wherein evaluating the formatted response to identify the correlation value comprises:
if the correlation value has a header value type performing a correlation logic conversion comprising:

if a character reference ampersand is present in the correlation value, replacing the character reference ampersand with an ampersand;

if a plus sign is present in the correlation value, replacing the plus sign with an encoded string plus sign; and performing a decoding operation on the correlation value.

14. The non-transitory computer-readable medium of claim 10, wherein the first value conversion operation comprises:

if a null character is present, removing the null character;

performing a decoding operation; and performing an unescape operation to replace a hexadecimal escape sequence present in the request with a character that the hexadecimal sequence represents.

15. The non-transitory computer-readable medium of claim 10, wherein the second value conversion operation comprises:

performing a byte decoding operation to produce a plurality of bytes; and performing a decoding operation on the plurality of bytes.

16. A system for generating test load scripts, comprising:

a collection processor operable to:

receive an archive of one or more transaction records between one or more web browsers and one or more servers, wherein each transaction record includes:

a request to access a resource stored on a server of the one or more servers, wherein each request includes a web address comprising a domain name identifying a location of the resource, and a response to the request to access the resource;

generate a list of each domain name included in each request of the archive of one or more transaction records;

display the list for selection by a user;

receive a selection of one or more domain names from the list;

determine one or more domain names identifying a portion of a network address belonging to a particular domain based on the selection of one or more domain names from the list, thereby generating one or more required domain names; and determine a collection of transaction records, the collection comprising each transaction record of the archive having the domain name of the request corresponding to the one or more required domain names;

a load test script processor operable to:

generate a plain load test script including each transaction record in the collection of transaction records, generating the plain load test script comprising:

converting the request of each transaction record in the collection of transaction records to a formatted request, converting the response of each transaction record in the collection of transaction records to a formatted response, and updating a template with the formatted request of each transaction record and the formatted response of each transaction record; and a load test script correlation processor operable to:

correlate the plain load test script to generate a correlated load test script, correlating the plain load test script comprising:

determining a time each request in the plain load test script occurs, updating the template to contain the time each request in the plain load test script occurs, and using the template, correlating each transaction record in the plain load test script in an order based on the time of each request in the plain load test script occurs, correlating each transaction record comprising:

evaluating the formatted response to identify a position of a correlation value, capturing a left boundary of the correlation value, capturing a right boundary of the correlation value, when the right boundary is able to be captured:

performing a boundary extraction method to extract the correlation value, and when the right boundary is not able to be captured:

performing a regular expression extraction method to extract the correlation value.

17. The system of claim 16, wherein updating the template with the formatted request of each transaction record and the formatted response of each transaction record further comprises performing an illegal character conversion operation.

18. The system of claim 17, wherein performing the illegal character conversion operation comprises:

if a null character is present in the template, removing the null character;

if an invalid character is present in the template, removing the invalid character; and performing a decoding operation.

19. The system of claim 16, wherein further comprising a load test system operable to perform a load test using the correlated load test script.

* * * * *